United States Patent
Elsasser (10) Patent No.: US 6,423,951 B1
(45) Date of Patent: Jul. 23, 2002

(54) ELECTRICAL RESISTOR HEATING ELEMENT

(76) Inventor: Manfred Elsasser, Fraubichl 20, A-6082 Patsch Oesterreich (AT)

(*) Notice: Subject to any disclaimer, the term of this patent is extended or adjusted under 35 U.S.C. 154(b) by 0 days.

(21) Appl. No.: 09/701,736

(22) PCT Filed: Jun. 14, 1999

(86) PCT No.: PCT/EP99/04087
§ 371 (c)(1),
(2), (4) Date: Feb. 2, 2001

(87) PCT Pub. No.: WO99/66766
PCT Pub. Date: Dec. 23, 1999

(30) Foreign Application Priority Data

Jun. 15, 1998 (DE) .......................... 198 26 544

(51) Int. Cl.[7] .............................. H05B 3/06; H05B 3/30; H05B 3/34
(52) U.S. Cl. .................. 219/541; 219/544; 219/528; 219/549
(58) Field of Search .................. 219/541, 216, 219/538, 528, 543, 544, 549, 552, 553; 338/254, 322, 330

(56) References Cited

U.S. PATENT DOCUMENTS

| | | |
|---|---|---|
| 4,134,004 A | 1/1979 | Anderson et al. |
| 4,327,282 A * | 4/1982 | Nauerth .................... 219/549 |
| 4,631,391 A * | 12/1986 | Tiepke ..................... 219/544 |
| 4,801,784 A | 1/1989 | Jensen et al. |
| 4,855,575 A * | 8/1989 | Melanson .................. 219/541 |
| 6,090,305 A * | 7/2000 | Balch et al. ............... 216/216 |

FOREIGN PATENT DOCUMENTS

| | | |
|---|---|---|
| DE | 28 56 178 | 7/1980 |
| EP | 38890 | * 11/1981 |
| EP | 0 585 857 A1 | 3/1994 |
| JP | 2000-347592 | * 12/2000 |
| WO | WO 89/05701 | 6/1989 |

* cited by examiner

*Primary Examiner*—Joseph Pelham
(74) *Attorney, Agent, or Firm*—Oliff & Berridge, PLC (57) ABSTRACT

A resistor heating element (1) has a resistive sheet layer (2) which contains a resistive material (preferably an electroconductive polymer) and is placed between at least two electroconductive layers (3, 4, 7) shaped as plane electrodes in order to form a sandwich element. Each layer (3, 4, 7) can be connected to a power supply line via contact studs. At least one recess (5) in the first electroconductive layer (3) is shifted relatively to a recess (6) in the second electroconductive layer (4) so that the two recesses (5, 6) (viewed in projection one on top of the other) are placed at a distance from each other. These recesses (5, 6) are located in the border region of the electroconductive layer (3, 4, 7) and at least one contact stud (34) can come into electrical contact and be mechanically connected to the other electroconductive layer (3) in the region of the recess (5) of a first electroconductive layer (4) via the resistive layer (2). Preferably, the contact stud (34) can also be connected to the resistive layer (2), especially through a crimp connection.

17 Claims, 5 Drawing Sheets

ELECTRICAL RESISTOR HEATING ELEMENT

The present invention concerns an electric resistor heating element according to the preamble of claim 1. Such resistor heating elements are used in many sectors, e.g., as floor radiation heating in the building industry. The resistor heating elements traditionally used where the heat is generated by so-called heating filaments or heater foils have the disadvantage of being sensitive to mechanical stress and of requiring a specialist for precise installation. In the document U.S. Pat. No. 4,801,784, a self-regulating heating element for the cable accessories and pipe protection industry is described which works with flat electrodes and a resistive layer arranged between the flat electrodes. In such a heating element, the flat electrodes are connected to the power supply lines, with rivets for instance. Thus, compression must be applied when making the connections, at which occasion a contact between the flat electrodes and hence a short circuit can occur.

Further, from the document DE-A1-2,856,178 an electric heater blanket is known where the heating conductors are laminated or coated onto a base film. For a connection of these heating conductors with the heating conductors of neighboring heater blankets, connection zones are provided where the bare heating conductors are exposed and can be connected by a galvanic process using solder or by mechanical methods using rivets. With such a structure, there is no risk of a short circuit since flat electrodes which could come in contact during riveting are not intended to be used. However, in the production of a heater blanket having certain dimensions, it may become necessary to connect a plurality of heater blankets.

For the use of a resistor heating element as a floor radiation heating, for instance, a uniform heat transfer across the surface on one hand and simple, durable installation and electrical connections on the other hand are important. Moreover, it must be possible to flexibly design the dimensions of the resistor heating element in order to accommodate the size of the surface to be heated.

It is the aim of the present invention, therefore, to provide a resistor heating element where without the risk of a short circuit or of injury to the resistor heating element, the electrical connections can be made in a simple way and so that they will at once resist mechanical stresses. It should further be possible to manufacture the resistor heating element in a continuous fashion, flexibly select its size, manipulate it in a simple way, and use it even in wet surroundings.

According to the invention, this aim is attained by a resistor heating element having the features of the characterizing part of claim 1. Advantageous further embodiments of the invention are described in the dependent claims. Flat electrodes in the sense of this invention is the term used for electroconductive layers adjacent to the resistive layer which are used for current feed.

The resistor heating element according to the invention, also designated as a resistor sandwich, offers predefined contact points based on recesses in the flat electrodes where one flat electrode at a time can readily be connected with the current feeder line. The contacts can be made by using high clamping pressures. With a resistor heating element having two flat electrodes, the tool is then applied in such a way that on one hand it penetrates into the recess of one flat electrode and on the other hand clasps the resistive layer, the other flat electrode, and the current feeder device or contact element. Because of the recess, a contact between the flat electrodes cannot arise even at high compression, thus avoiding a breakdown or arc-over of voltage.

When making a force or form-locking connection between the current feeder lead and the flat electrode in the resistor heating element according to the invention, it is also possible to use contact components connecting in depth with the flat electrodes. In this case clamps can be used which at predetermined points penetrate from above and below into the resistor heating element via electroconductive contact lugs or teeth. One of the contact lugs is introduced from one side of the resistor heating element into the recess of the first flat electrode, penetrates the resistive layer, and is in contact with the second flat electrode. The second contact lug makes contact with the second flat electrode from the other side. The two contact lugs in turn are electrically connected with a current feeder line, for instance with the phase conductor. Such an in-depth electrical contact with a resistor heating element can only be made with a resistor heating element according to the invention. In the case of traditional resistor heating elements, such a way of making electrical contacts would short-circuit the flat electrodes and damage the resistor heating element. Beyond the precise connection of exactly one flat electrode, the way of making contacts according to the invention also has the advantage that the form-locking connection between the flat electrode and the current feeder can withstand tensile and tangential stresses.

A seal, for instance in the form of a silicone lip, can be provided around each contact component. In the resistor heating element according to the invention, the contact component can be applied with the pressure required for sealing. Possible uses in wet surroundings are thus opened up.

The resistor heating element according to the invention can readily be produced by traditional lamination operations, and because of the small risk of a short circuit encountered when making the electrical contacts, can also be connected and installed by workers (such as construction workers) having little electrotechnical training.

By suitable arrangement of the recesses in the border zones of the electroconductive layers, each single layer of the two or more layers can be contacted selectively. Thus, a ground wire, a neutral conductor and a layer connected to the phase conductor can be arranged within the resistor heating element. Each of these layers can be electrically connected individually in depth without short-circuiting the electroconductive layers. None of the three layers will come into contact with another layer, even when making the electrical connections while using high compression, so that a short circuit is effectively prevented.

According to claim 4, several groups of recesses can be provided along the borders of each of the electroconductive layers in the resistor heating element, each individual layer having at least one recess. The distances between the groups of recesses are preferably uniform.

Thus, in this embodiment several contact points are available at the border of the resistor heating element. The number of recesses to be provided per group depends on the number of electroconductive layers present in the resistor heating element. The number of recesses per group preferably is one less than the number of layers. In view of the large number of contact points, a decision can be made on the spot when installing the resistor heating element, as to which of the contact points are nearest to the current source and hence should be connected to it.

In the embodiment according to claim 5, additional contact possibilities are provided across the surface, apart from those existing in the border zone of the resistor heating element. When cutting the resistor heating element, and with the cut passing through the additional recesses provided across the surface, one can use these recesses as border contact points after splitting the resistor heating element. In this embodiment, therefore, the resistor heating element can be cut up on the spot to parts having the desired size, while always several possibilities will be available along the border of the resistor heating element for making electrical connections with the individual electroconductive layers.

The spatial separation of the projections of the individual recesses yields enhanced safety in avoiding the contact between the electroconductive layers or contact lugs of the current feeder leads. The contacting component, for instance a clamp with contact lugs, which as a rule has dimensions smaller than the recess, need not be inserted exactly into the center of the recess of one of the electroconductive layers in this preferred embodiment but can also engage close to the edge of the recess so long as it meets the condition of claim 2. This additional safety mechanism considerably facilitates the making of electrical connections at the resistor heating element, and no precision tools are needed for it.

The embodiment according to claim 6 has the advantage that straight cuts can be performed along one of the longitudinal or transverse lines along which the additional recesses are arranged when the resistor heating element is cut down to the desired size.

Furthermore, according to claim 7 or 8, a short circuit and other damage, for instance by a disruptive discharge of the voltage, is avoided at points where a short circuit might occur, for instance in the zone where forces act during the making of electrical connections, by providing free or non-conducting zones. A filler material that might be present can be so selected that it is insulating and at the same time has reinforcing or stiffening properties. This can serve to provide additional stability to the resistor heating element in individual zones, and to insulate the electroconductive layers from each other.

The recesses provided in the border zone of the resistive mass provide additional safety since it is in this zone that electrical connections are made and forces are applied. The mosaic-like array of such zones along lines in the longitudinal and transverse direction of the resistor heating element which preferably coincide with the lines along which the additional recesses across the surface of the electroconductive layers are arranged, facilitates the splitting of the resistor heating element into smaller pieces since the lines serve as the cutting edges. Particularly in the presence of filler materials having stiffening or reinforcing properties, therefore, injury to the resistor heating element arising from a compression of the resistive layer along the cutting edge can thus be avoided. Moreover, the insulating properties of the filler material can also counteract a short circuit, particularly at the points of the recesses where the electrical connections are made.

Openings in the electroconductive layers according to claim 9 or 10 which can for instance be present in the form of circular holes allow the resistor heating element to be fixed at the wall or on the floor with traditional fasteners such as nails or screws. The openings then prevent a short circuit that could be produced by the nail or screw.

The filler material which preferably has reinforcing or stiffening properties and can serve as an insulation can also function as an additional fixation in the region of the openings. By passing the screw or nail through the resistive layer which at this point is provided with filler material, a radial slip of the screw inside the opening, for instance because of the resistor heating element's own weight when fixed at a wall, can be prevented by the filler material.

In a resistive layer comprising a support material which according to claim 11 is coated with the resistive mass, the elasticity or plasticity of the resistive layer can be adjusted by appropriate selection of the support material. Moreover, even the resistance value of the resistive layer can be adjusted in an ideal manner when such a structure is present. The more highly porous the support material selected, the larger will be the amount of resistive mass that can be taken up by it. Moreover, the support material can be present as a continuous layer where only those regions that should be free of resistive mass are bypassed when coating the layer with resistive mass. The preparation of the resistive layer which for instance can occur by offset printing is simple and admits a precise layout of regions with and without resistive mass.

An electroconductive polymer is readily applied to a support material; at the same time high electric heating outputs can be achieved with such a resistive mass. Moreover, the electroconductive polymer is flexible so that even a mechanical stress, for instance when the resistor heating element is rolled up, will not lead to injury of the resistive mass and thus to undesirable ruptures in electric conduction within the resistor heating element.

In the following the invention will be explained with reference to the appended drawings showing.

Figure 1A:
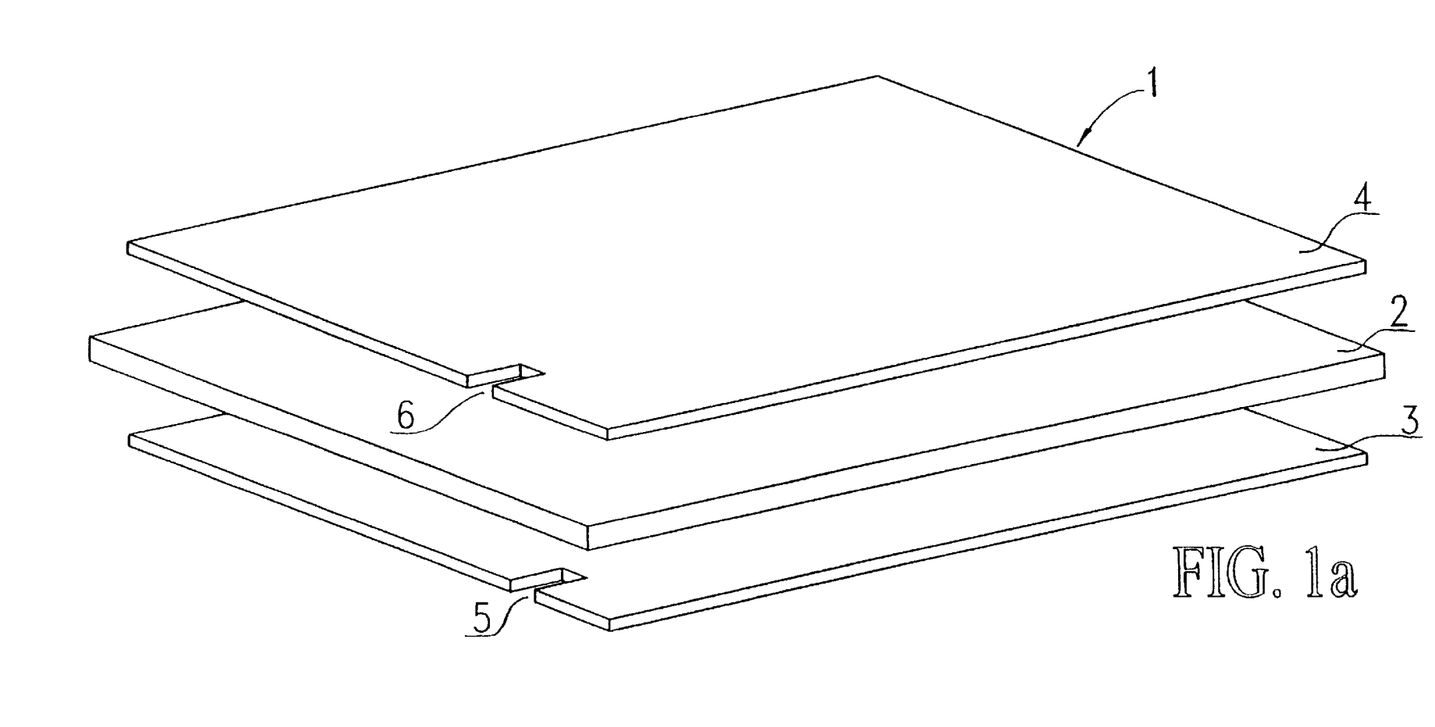
In FIG. 1a a perspective view of a resistor heating element according to the invention with two flat electrodes.

In FIG. 1a, a resistor heating element 1 is represented where a resistive layer 2 is arranged between two electrical layers (in the following also called flat electrodes) 3 and 4. A recess 5 is provided at an edge of the flat electrode 3. This is offset relative to the recess 6 present in the border region of flat electrode 4.

FIG. 1a is an exploded view of the resistor heating element. The flat electrodes 3 and 4 are bonded with the resistive layer 2, for instance adhesively. A contacting component, for instance a clamp with contact lugs (see part 34 in FIG. 3) can be attached to the border of the resistor heating element shown in order to electrically connect this element. This enables the flat electrode 3 to be connected with a current feeder lead by engaging into the recess 6. A contact between a current feeder lead and the flat electrode 4 can be created when attaching the contacting component in recess 5.

Figure 1B:
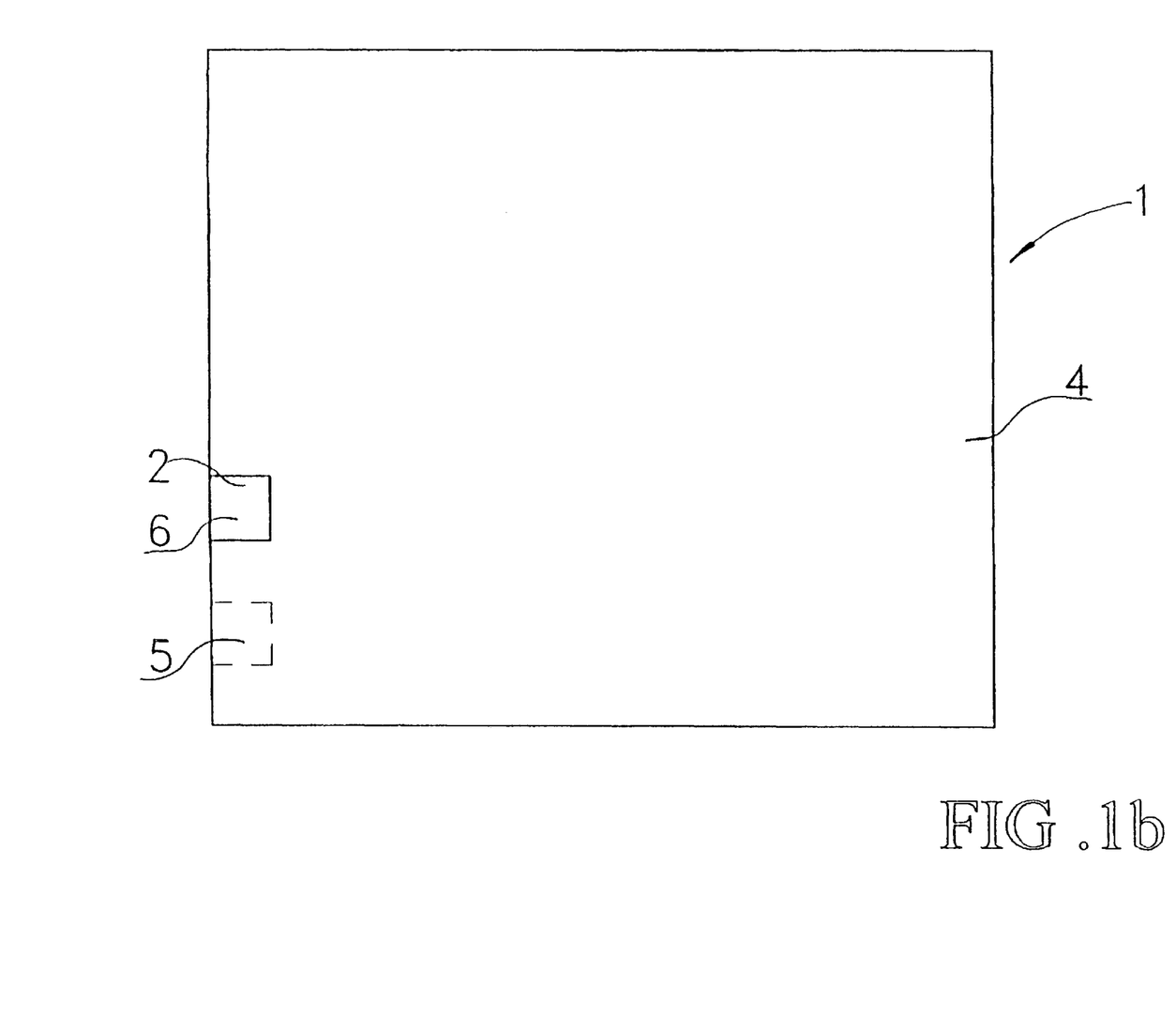
In FIG. 1b a top view of the resistor heating element of FIG. 1a according to the invention.

FIG. 1b shows the positions of the recesses 5 and 6 relative to each other. It becomes obvious from FIG. 1b that the recesses 5 and 6 are not superimposed in their projections. The separation between the recesses 5 and 6 is selected so that on one hand one avoids that the compression applied during contact making in the region of one of the recesses has any influence on the neighboring recess, and on the other hand the flat electrodes can be connected with current leads run within a cable.

Figure 2:
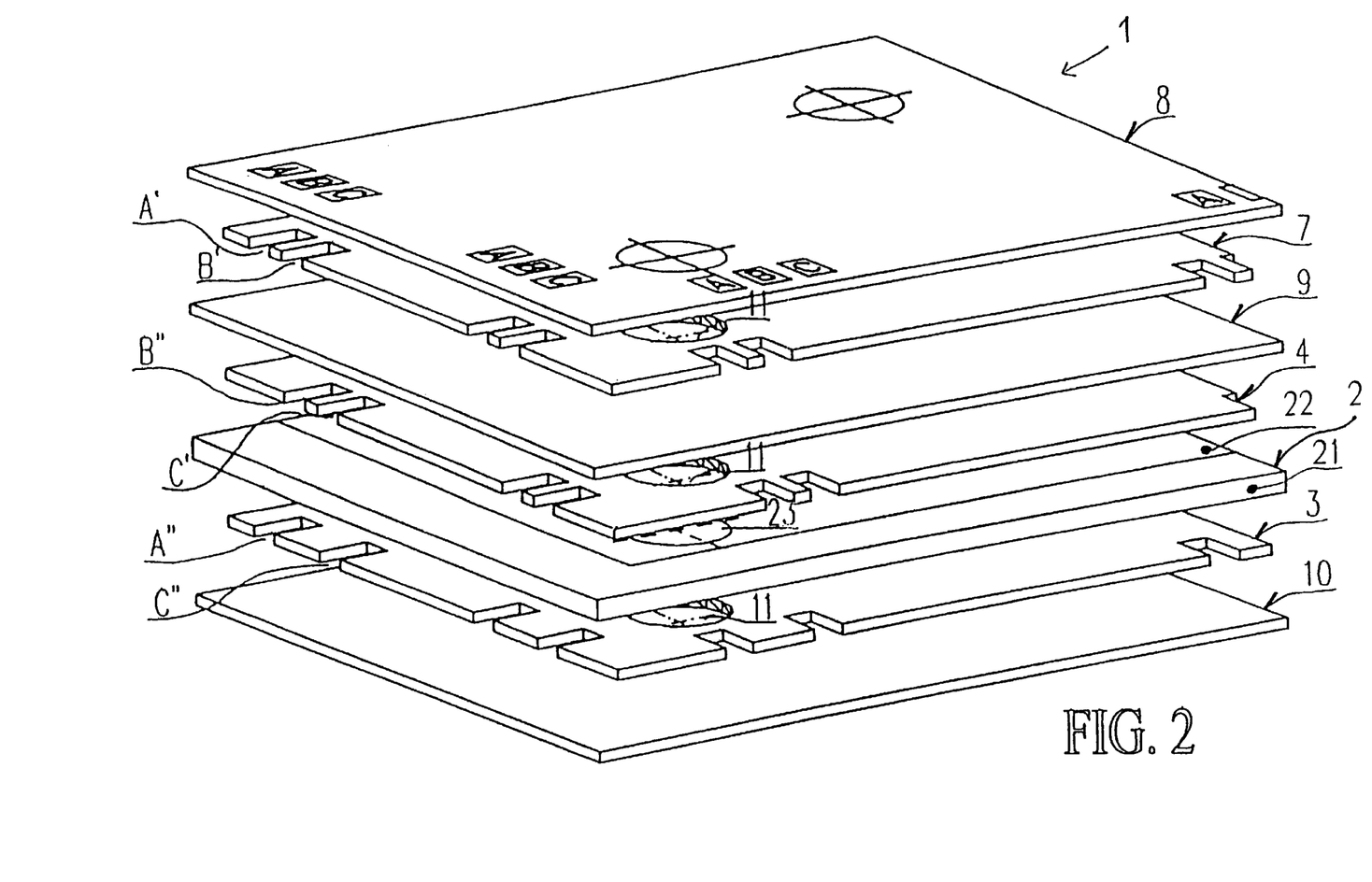
In FIG. 2 a perspective cutaway of an embodiment of the resistor heating element according to the invention with two flat electrodes and an additional electroconductive layer.

FIG. 2 shows a resistor heating element 1 where three electroconductive layers (two flat electrodes and a further electroconductive layer) 3, 4 and 7 are provided. The electroconductive layer 7 is covered by an insulating layer 8 and separated on the opposite side by a further insulating layer 9 from the flat electrode 4. The resistive layer 2 is arranged between the flat electrodes 3 and 4 while the side of the flat electrode 3 facing away from the resistive layer 2 is covered by a further insulating 5 layer 10.

Each of the electroconductive layers has several recesses in its border region. The recesses are arranged in groups of two recesses each. The recess pairs are so arranged that one recess is superimposed onto a recess of another electroconductive layer but offset relative to the recesses of the third electroconductive layer. Thanks to the recesses, each of the three conductive layers 3, 4 and 7 can be contacted individually when, for instance, the electroconductive layer 7 functions as the grounded conductor, the electroconductive layer 4 as neutral conductor, and the electroconductive layer 3 as the layer connected to the phase conductor. Thus, the contact with the electron conductive layer 4 is established by attaching the contacting component at position A in such a way that it penetrates all of the resistor heating element. By the application of compression and the insertion of contact lugs (not shown here, but see FIG. 3), one of the lugs can reach the electroconductive layer 4 when passing through recess A' as well as the insulating layers 8 and 9, and make contact with this layer. From below, a second contact lug penetrates the recess A", the insulating layer 10, as well as the resistive layer 2 and thus reaches the lower face of the electroconductive layer 4. In a corresponding way electrical connections can be established through recesses B', B" to the electroconductive layers 3 and through recesses C' and C" to the electroconductive layer 7.

In the embodiment shown in FIG. 2, the border region 21 of the resistive layer is provided with an insulating filler material. In this embodiment, the resistive mass is only present in the region of the resistive layer designated with 22. At the border of the resistor heating element 1, therefore, one finds a reinforced or stiffened region 21 of the resistive layer 2 which in addition exhibits insulating properties. Therefore, an electrical connection can be made through this resistive layer 2 without any voltage drop and without the risk of a short circuit. Furthermore, openings 11 in the electroconductive layers are shown in FIG. 2. These openings 11 are circular, and each of them is so arranged within the surface of the electroconductive layers 3, 4 and 7 that the individual openings 11 of the electroconductive layers 3, 4 and 7 are superimposed. In the region of the openings 11 on the resistive layer 2, another region 23 is provided where this layer is free of resistive mass and preferably fitted with filler material having reinforcing and insulating properties. A means of fixation, for instance a screw, when inserted through the openings 11 and through the resistor heating element 1, will not come into contact with any of the electroconductive layers 3, 4 or 7, and is retained in particular in region 23 by the resistive layer 2 fitted with insulating material.

Figure 3:
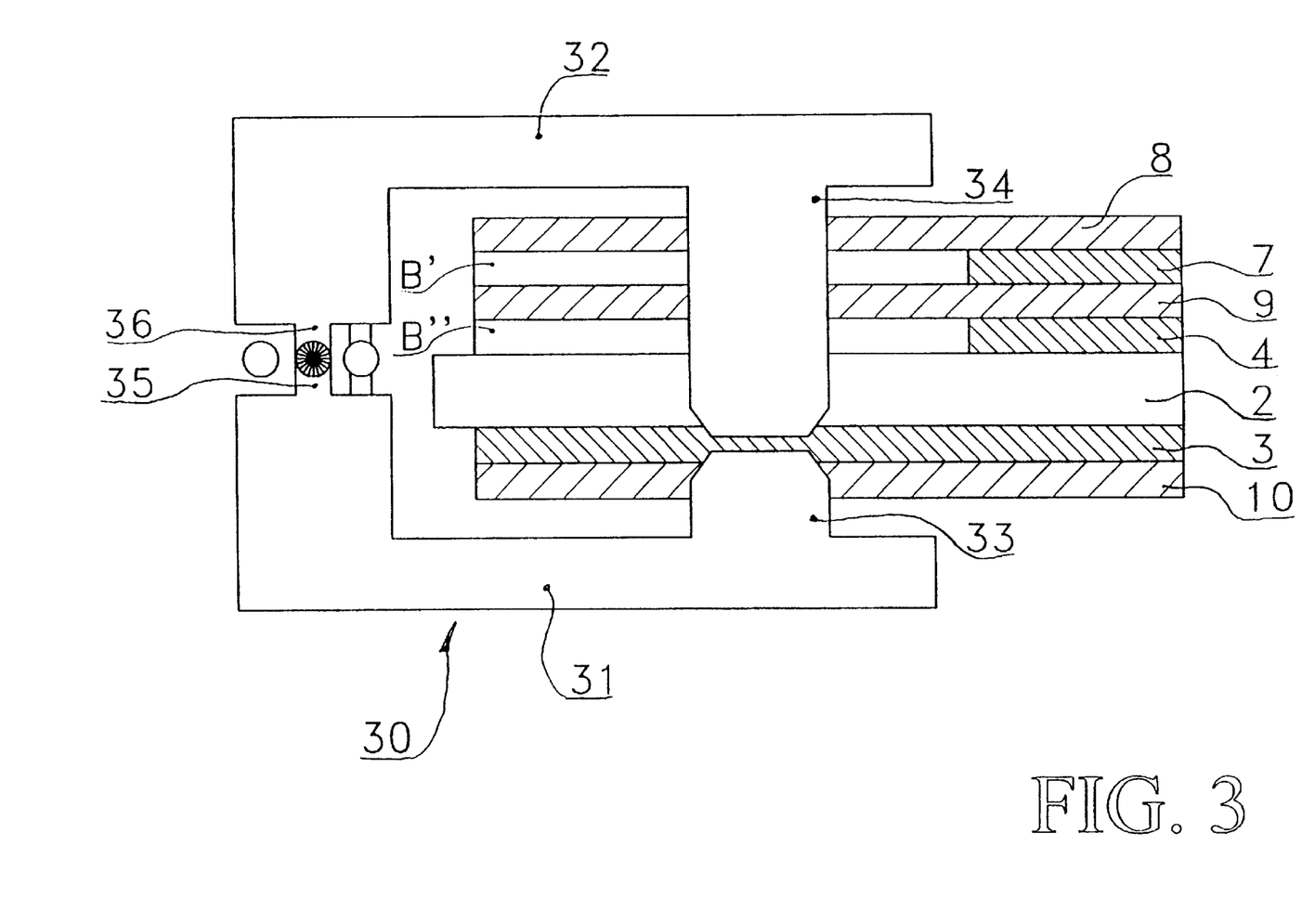
In FIG. 3 a partial section through a resistor heating element according to FIG. 2 with contacting component.

FIG. 3 shows the section through a contact point of the resistor heating element according to FIG. 2 in position B. The contacting component 30 has two arms 31, 32, and each of the arms 31, 32 has a contact lug 33, 34. Applying compression, the contact lug 34 is passed through the insulating layer 8, the recess B' of the electroconductive layer 7, the insulating layer 9, the recess B" of the electroconductive layer 4, and the resistive layer 2 in region 21. The tip of contact lug 34 thus reaches the electroconductive layer 3 and makes a form-locking connection with it. The contact lug 33 extends through the insulating layer 10 and engages in the electroconductive layer 3. At their other ends, arms 31, 32 have projections 35, 36 which engage into a current lead while compression is applied. The contacting component 30 consists of electroconductive material, for instance copper. An electrical connection is established, on one hand through the contact with the current lead, for instance the phase conductor, and on the other hand through the contact with the electroconductive layer 3. The contact lugs also lead to a mechanically stable connection when engaging into the electroconductive layer 3. A direct short circuit of the other electroconductive layers 4 and 7 is avoided because of the recesses present in these other layers and penetrated by the contact lug 34. Offset relative to the contacting component 30, corresponding further contacting components are provided, each engaging into a further current lead and connecting it with one of the other electroconductive layers 4 or 7. Such an advantageous way of making electrical connections is only possible with the resistor heating element of the invention.

Figure 4:
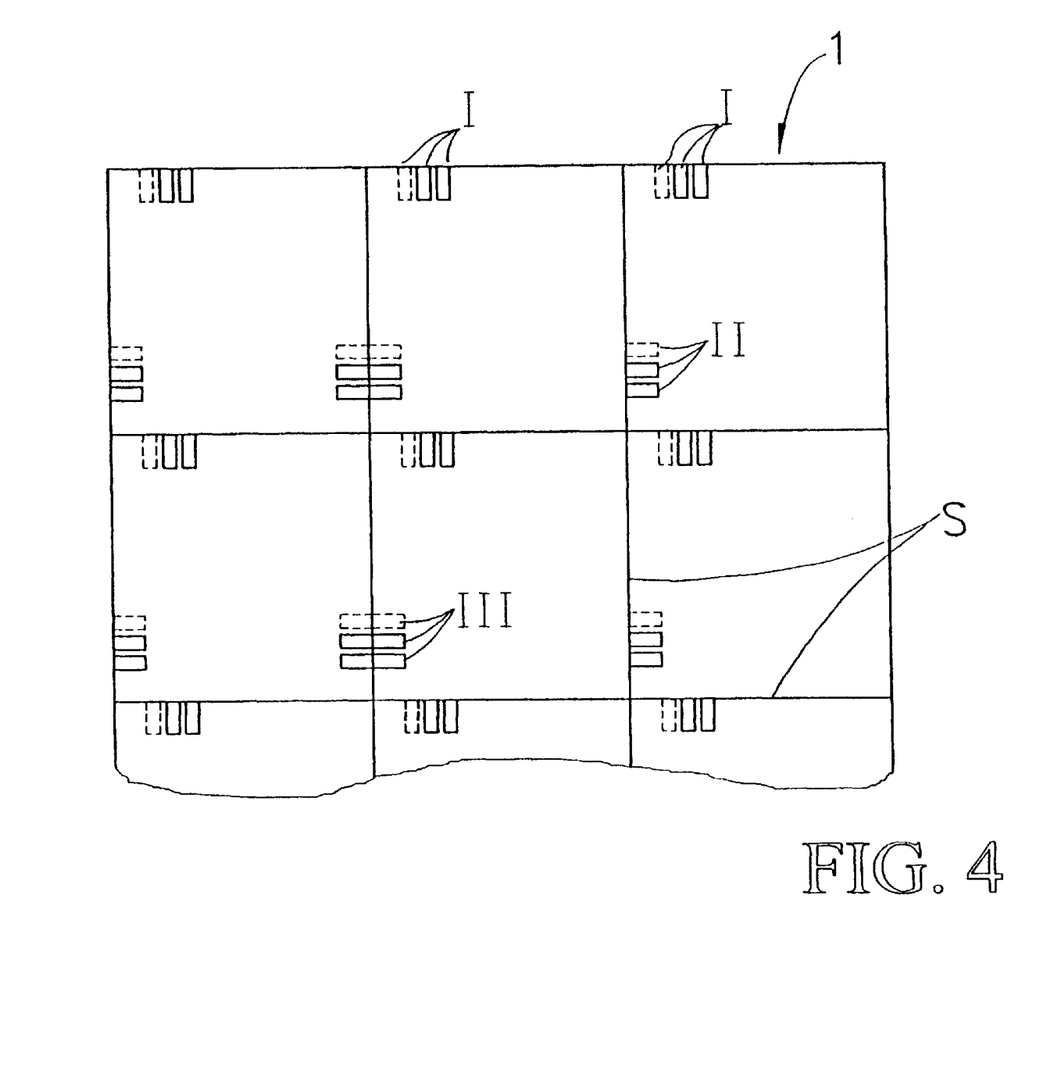
In FIG. 4 a top view of a resistor heating element according to the invention with two flat electrodes, an additional electroconductive layer and several recesses across the surface.

In FIG. 4, a resistor heating element 1 is shown where in addition to the recesses at the border which are designated by I, further recesses II are provided across the surface of the individual electroconductive layers. These recesses are arranged along lines S. The lines extend in the longitudinal and transverse direction of the resistor heating element 1. The lines S can serve as cutting edges when splitting such a resistor heating element 1. This furnishes parts of a resistor heating element which themselves can serve as a (smaller) resistor heating element, and have several contact points in their border region.

The width of the resistor heating element can vary depending on the application. However, widths of for instance 1.5 m can be realized with the heating element according to the invention. The lines along which recesses are provided across the surfaces of the individual, electroconductive layers can for instance be arranged with a spacing of 20 cm. Even a finer subdivision of the resistor heating element is possible, for instance by providing several lines in the longitudinal and transverse direction, if locally particularly small resistor heating elements are needed.

Additional recesses III across the surface can also be arranged in such a way that they extend across the lines S. In this way a possibility for making contact at the border arises at each of the resistor heating elements produced when splitting the resistor heating element 1.

Depending on the application, the thicknesses of the individual layers of the resistor heating element can be selected differently. Thus, the resistive layer can have a thickness of 1 mm, the electroconductive layers as well as the insulating layers can have a smaller thickness of for instance only 0.1 mm.

In the resistor heating element according to the invention, preferably three electroconductive layers are present. However, it is also within the scope of the invention to provide more than three electroconductive layers, in which case the recesses of the layers are arranged in such a way that a contacting component, for instance a contact lug, will reach just one electroconductive layer when engaging. Therefore, the recesses of a heating element according to the invention are always arranged in such a way that always one recess of an electroconductive layer is superimposed with a recess provided at one or several other electroconductive layers but is offset relative to a recess of one other electroconductive layer.

The recesses are preferably arranged at the edge of the electroconductive layer, but they can also be situated a small distance away from the edge in the border region of the electroconductive layer. The recesses can have the most diverse shapes, for instance rectangular or round. The shape and size of the recess of one layer preferably correspond to the shape and size of the recesses of the other layers. The recesses can for instance have a width or diameter of 5 mm, preferably of 10 mm. The separation between the projections of recesses associated with a single group is also 5 mm, for instance, and preferably 10 mm.

Where several groups of recesses are provided along the border region or along lines in the longitudinal or transverse direction, their separation can be selected arbitrarily, and is for instance 100 or 50 mm.

The insulating layers can consist of known insulating materials, for instance polyester. The individual layers of the resistor heating element according to the invention can be interconnected by traditional methods. Thus, the resistive layer can be bonded to the electroconductive layers surrounding it, by an adhesive layer applied in advance on the electroconductive layers. The adhesive layer preferably has the same conductance or resistance as the resistive layer. However, it is also within the scope of the invention that the resistive mass provided in the resistive layer at once serves as the adhesive. The insulating layers can be bonded to the electroconductive layers by the insertion of plastic sheets, for instance polyester sheets, between these layers and subsequent heat treatment.

In the regions where a filler material is provided in the resistive layer, the latter is preferably not adhesively or otherwise bonded with the electroconductive layers surrounding it. This discontinuity in the bonding has a great advantage particularly in the border regions or along the lines where the resistor heating element can be cut up. With the aim of avoiding disruptive discharge voltages, the electroconductive layers preferably are made in dimensions such that their border recedes by a few millimeters relative to the resistive layer (see FIG. 2). The part of the electroconductive layer which should be removed in order to avoid disruptive discharge voltages is readily pulled out after the cutting when the electroconductive layer is not adhesively bonded to the resistive layer in this region. This region which extends over the border regions and, where applicable, along lines arranged as a grid is small relative to the overall size of the resistor heating element. For instance, the linear regions without resistive mass in the resistive layer—though where applicable, with a filler material—have a width of about 10 mm. To the contrary, the neighboring region of the resistive layer containing resistive mass can have a width of about 100 mm. Within the region of the resistive layer covered by filler material or insulating material, a temperature equilibration occurs across the surface of the electroconductive layer. Hence even in these regions an accumulation of heat will not occur.

The small dimensions of the regions where the resistive layer can be provided with a filler material imply that even the flexibility of the entire resistor heating element will not be impaired. It is hence possible to produce resistor heating elements of any size which in regions along lines extending in the longitudinal and transverse direction have filler material in the resistive layer. In view of the flexibility of the entire resistor heating element, this can be made as an endless product. This endless product can be wound on rolls and taken off as needed. Traditional laminating installations in which a number of layers are processed to a multilayer structure are used to produce such an endless material. The predefined cutting edges along which the recesses additionally provided across the surface in the electroconductive layers are lined up, as well as the contact points in the border region and the positions of the openings in the electroconductive layers preferably are marked out on one of the outer insulating layers. It is thus possible to cut the resistor heating element on the spot to the desired sizes and connect it with the current leads. The resistor heating element when provided with the electrical connections can then be attached to the wall or floor, for instance with screws, at those points where openings are provided in the electroconductive layers.

The resistor heating element according to the invention can find versatile uses, even and in particular in wet surroundings, because of the possibilities for making contact which are given by the recesses in the individual electroconductive layers. The electrical connections can be made under high compression, while additional silicone lips can be used at the contact points as seals against water. Furthermore, in the resistor heating element according to the invention, electrical connections can be made in such a way that the contact with the electroconductive layers is established in depth, that is, at the position of each electroconductive layer. The only requirement that remains is that of sealing the entrance points of the contact lugs or studs. All of the remaining surface of the resistor heating element, and particularly the border of the resistive layer or of the electroconductive layers, can be made water-tight by a is polyester sheet applied by welding. At the entrance points of the screws, sealing against the entry of water is attained by the screwhead, which if needed can in addition have a silicone lip at its borders.

Thus, with the resistor heating element according to the invention, degrees of water tightness can be achieved which allow the resistor heating element to be used in zones of spray water. Because of the possibilities for making electrical connections provided by the recesses, which procure a high safety against injury of the resistor heating element, this element can be used, both in low and in line voltage technology.

A suitable resistive layer is selected as a function of the application. The preferred support material of the resistive layer is a woven fabric or a flexible, porous plastic. Glass fiber mats or nonwoven polypropylene fabrics can for instance be used. The amount of resistive mass that can be taken up by the resistive layer can be influenced by the porosity or density of the support material.

A plastic comprising an electroconductive polymer is preferably used as the resistive mass. Polymers which are conductive by added metal or semimetal atoms can in particular be used as the electroconductive polymer. Both electroconductive polymerizates such as polystyrene, polyvinyl resins, polyacrylic acid derivatives and their mixed polymerizates, and electroconductive polyamides and their derivatives, polyfluorinated hydrocarbons, epoxy resins and polyurethanes can be used.

Metal layers can be used as the electroconductive layers, and aluminum foils which allow the recesses and openings to be punched out are particularly preferred. In this embodiment, the resistive mass or the filler material can be applied by offset printing to the support material of the resistive layer.

However, metal layers for instance of aluminum, copper, nickel etc. which have been applied by other coating processes known per se, for instance by spraying, sputtering or evaporation, can also be used as electroconductive layers. This has the advantage that the structure of the recesses in the conductive layers which serves for making electrical connections or for fastening of the heating sandwich elements can be produced in a simple fashion by corresponding masks. Prerequisite for metal spraying in particular is a resistive layer which is porefree throughout and as homogeneous as possible so that it will prevent short circuits between neighboring conductive layers. In this embodiment, the resistive mass itself must be deaerated in a vacuum vessel prior to coating of the support layer.

Nonconductive plastic is preferably used as the filler material, the ratio of the electric conductivities of the filler material and the resistive mass preferably being larger than 1:5.

What is claimed is:

1. Electrical resistor heating element with a flat resistive layer containing a resistive mass and disposed between at least two electroconductive layers formed as flat electrodes and disposed congruently, such that a sandwich element results where each conductive layer can be connected with one feeder line, characterized in that—at least in the border region—at least a first recess in the first electroconductive layer is offset relative to a second recess in the second electroconductive layer in such a way that the two recesses—when seen in superimposed projections—are mutually separated, so that each of the electroconductive layers can be contacted selectively and connected mechanically on both sides with the corresponding feeder line in the region of a corresponding recess in a direction normal to the conductive layers, while the contacted conductive layer is accessible on one side through one of the recesses and through the resistive layer.

2. Resistor heating element according to claim 1, characterized in that it comprises at least one further electroconductive layer separated by an insulating layer from one of the two electroconductive layers, where each of the electroconductive layers has at least two recesses and at least one recess of an electroconductive layer is located at a point at which in only one of the other electroconductive layers no recess is present, so that each current feeder line can be electrically connected through the recesses with the electroconductive layer having no recess in the projection of the corresponding recesses.

3. Resistor heating element according to claim 2, characterized in that along the borders of each of the electroconductive layers, groups of recesses are provided.

4. Resistor heating element according to claim 2, characterized in that the electroconductive layers exhibit additional recesses across the surface which are so arranged that each electroconductive layer has at least one spot not provided with a recess where the corresponding recesses of the other layers are superimposed with the additional recesses.

5. Resistor heating element according to claim 4, characterized in that the additional recesses all are arranged in groups as a grid along lines in the longitudinal and/or transverse direction in the plane of the electroconductive layers of the resistor heating element.

6. Resistor heating element according to claim 4, characterized in that it is reeled up in a length that is at least 10 times its width and can be taken off the reel.

7. Resistor heating element according to claim 6, characterized in that it is reeled up in a length that is at least 100 times its width and can be taken off the reel.

8. Resistor heating element according to claim 2, characterized in that the resistive layer has at least one region which is free of resistive mass and preferably contains a filler material that more particularly is a plastic with at most 20% of the conductance of the resistive mass.

9. Resistor heating element according to claim 8, characterized in that the at least one region extends over the border region of the resistive layer and/or as a grid along lines in the longitudinal and/or transverse direction of the resistor heating element.

10. Resistor heating element according to claim 8, characterized in that the electroconductive layers each have at least one opening in the plane where these openings, in their projections, are mutually superimposed and superimposed with the at least one region in the resistive layer that is free of resistive mass.

11. Resistor heating element according to claim 10 fixed to a base, characterized in that a means of fixation penetrates through the openings into the base and protects the resistor heating element against spray water.

12. Resistor heating element according to claim 11, characterized in that the means of fixation protects the resistor heating element against spray water by means of a ring seal fixed at the bottom side of its head.

13. Resistor heating element according to claim 2, characterized in that the resistive layer comprises a support material that is coated with the resistive mass.

14. Resistor heating element according to claim 2, characterized in that at least one of the respective outermost, electroconductive layers is covered by an insulating layer on which preferably the position of the recesses and/or openings situated underneath is marked.

15. Resistor heating element according to claim 2, characterized in that the resistive layer is essentially porefree while if applicable at least one of the electroconductive layers is a spray metal layer.

16. Resistor heating element according to claim 2, characterized in that the electroconductive layers can be electrically connected with a crimping clamp.

17. Resistor heating element according to claim 1, characterized in that the separation of two neighboring recesses is selected large enough so that over the corresponding distance, the resistance of the resistive layer in its plane is at least five times higher than that normal to this plane.

* * * * *